United States Patent Office 3,349,400
Patented Oct. 24, 1967

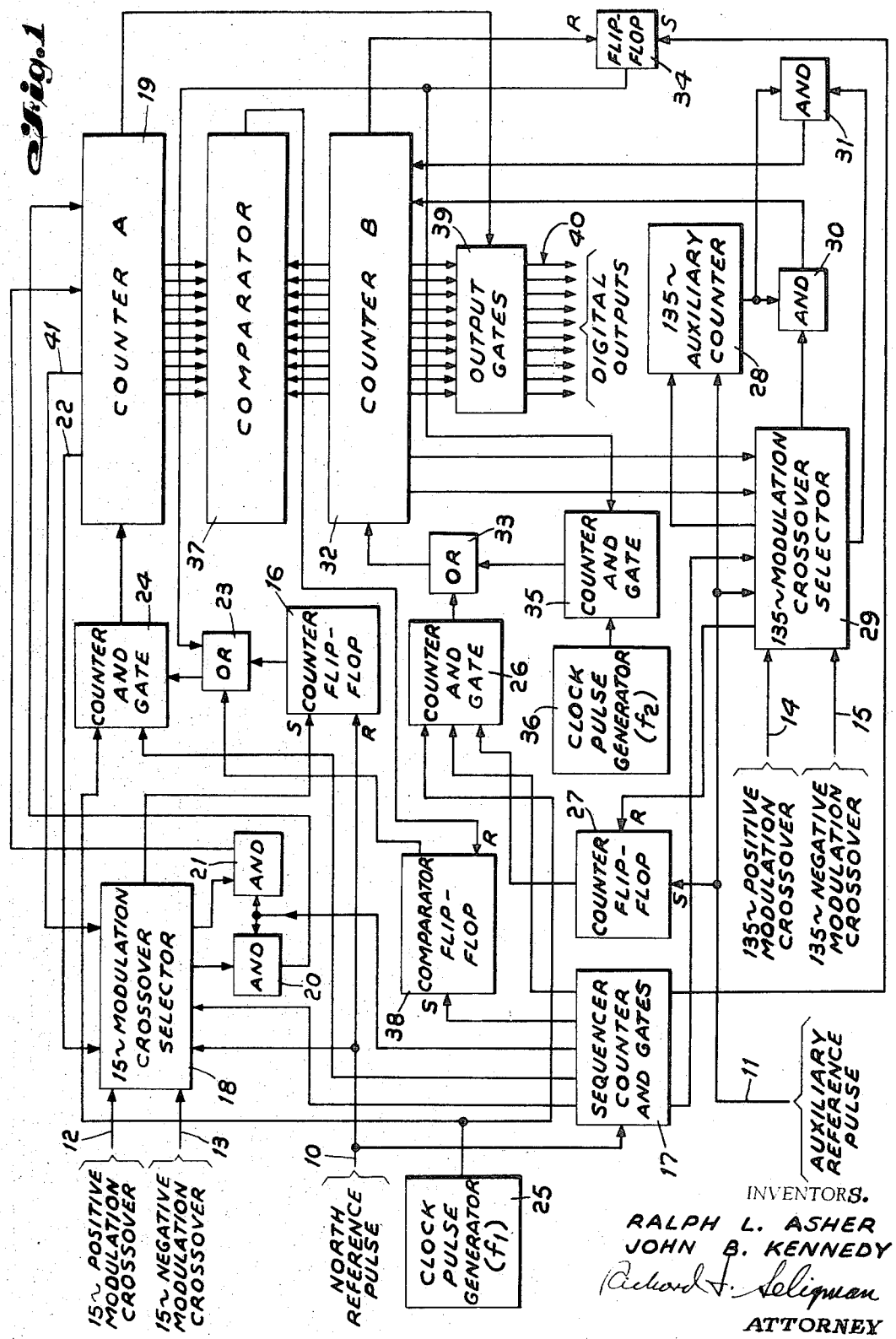

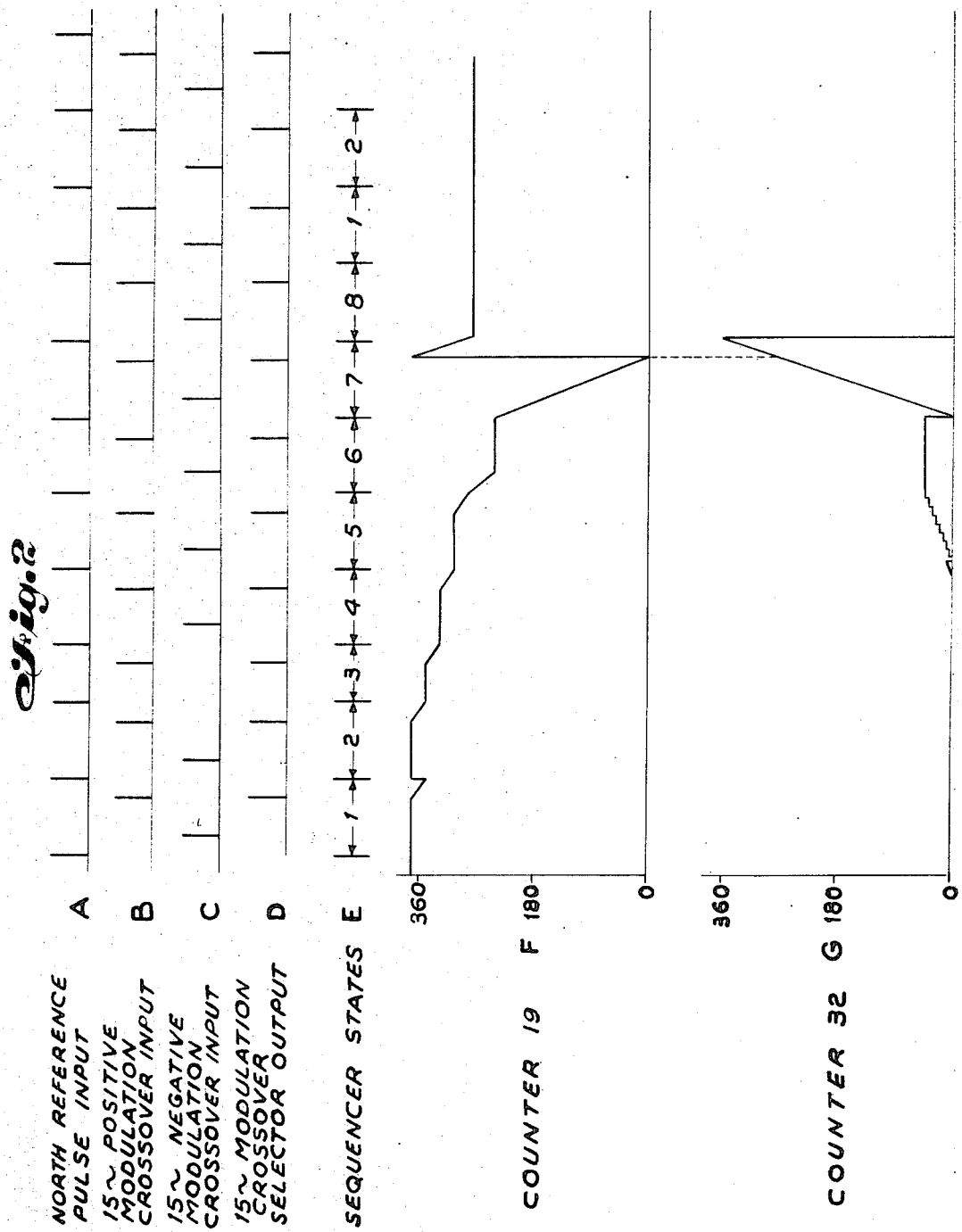

3,349,400
DIGITAL BEARING MEASURING SYSTEM
Ralph L. Asher, Hackensack, and John B. Kennedy, Montville, N.J., assignors to International Telephone and Telegraph Corporation, Nutley, N.J., a corporation of Maryland
Filed Mar. 31, 1966, Ser. No. 539,165
10 Claims. (Cl. 343—106)

This invention relates to aerial navigation bearing systems and more particularly to a digital bearing measuring system.

In certain aerial navigation systems such as Tacan, described in volume 33, March 1956, of "Electrical Communication," the technical journal of the International Telephone and Telegraph Corporation and associated companies, azimuthal information is given by the relative phase between reference signals and a multi-lobed rotating antenna pattern which phase varies at different azimuthal positions with respect to the beacon. The beacon transmits several different types of pulse signals which the airborne radio set translates into bearing and distance information. The transmitting antenna system in the beacon produces a multi-lobed directional pattern rotating at about 15 cycles per second. To a receiver receiving the pulse signals from the transmitter, the rotation of the antenna pattern produces an amplitude modulation envelope on these pulses. When the major lobe of the directional pattern points in a given direction, such as north, a special signal in the form of a short burst of pulses is transmitted from the beacon, which signal is referred to as the "north reference signal." By comparing the phase of the modulation envelope, due to rotation of the beacon pattern, with that of the north signal, an indication of the bearing of the receiver with respect to the beacon is obtained. If only the north signal and a single-lobed directional pattern were employed, only a relatively coarse indication of bearing would be obtainable. To obtain a finer indication, the directional pattern is multi-lobed with each lobe separated, for example by 40° from the next, and with auxiliary reference pulse signals in the form of short bursts of pulses being emitted each time one of these lobes passes the predetermined reference point (for example, the north) as the antenna pattern is rotated. The rotation of this pattern produces a modulation envelope of 135 cycles per second (9 lobes multiplied by 15 cycles per second) on top of the fundamental of 15 cycles per second due to the main directive lobe. By comparing the phase of the auxiliary pulse signal with respect to that of the 135 cycle per second modulation enevelope a fine azimuthal indication is obtained.

In summary the bearing radial to a ground beacon is derived by processing the Tacan composite video signal from the continuously radiated ground beacon signal. This signal consists of a main reference burst, eight auxiliary reference bursts, a 15 c.p.s. amplitude modulation component, and a 135 c.p.s. amplitude component. Our invention relates to a system for processing this information into the true Tacan bearing.

The analog representation of the bearing function is sinusoidal and continuous. On the other hand the digital form of the bearing contains a sharp discontinuity at 360 degrees. In the Tacan bearing system these discontinuities exist at each 40 degree increment. This can be troublesome when the modulation crossover occurs at one of these discontinuities. When digital measurements are made, the signal may be measured on alternate sides of the discontinuity. During the digital averaging process this would result in a gross error (i.e., the average of 0° and 360° is 180°). Our invention removes this possibility by using the negative going modulation crossover (180°) when the positive going crossover (0°) is near a discontinuity.

The invention described herein permits phase siting errors between the 15-c.p.s. and 135-c.p.s. modulation components of up to 20 degrees to take place without resulting in false resolution of the coarse-fine ambiguity.

Accordingly, it is an object of the present invention to provide a novel bearing measuring system using primarily digital techniques.

Briefly, the invention provides a receiver for a digital bearing measuring system comprising a first counter in which a value proportional to coarse bearing is stored, a second counter in which a value proportional to fine bearing is stored and means for comparing the values stored in the counters such that major siting errors can be resolved.

The above-mentioned and other features and objects of this invention will become more apparent by reference to the following description taken in conjunction with the accompanying drawings, in which:

FIG. 1 is a block diagram illustrating a novel digital bearing measuring system; and FIG. 2 is a group of waveforms for explaining the block diagram of FIG. 1.

FIGURE 1 is a block diagram of a novel Tacan digital bearing measuring system according to the invention. The inputs to the system are recovered signals from the airborne Tacan receiver circuitry (not shown). These signals consist of north reference pulses 10, auxiliary reference pulses 11, positive (0°) crossovers of the 15 cycle modulation signal 12, negative (180°) crossovers of the 15 cycle modulation signal 13, positive (0°) crossovers of the 135 cycle modulation signal 14, and negative (180°) crossovers of the 135 cycle modulation signal 15.

The north reference pulses which occur at the rate of approximately 15 times each second are supplied to the reset lead of a bistable multivibrator, counter flip-flop 16, and to the input of a sequencer circuit 17. Sequencer 17 is composed of a three bit counter with gates furnished to recognize the states of the counter. The north reference pulses are also supplied to a 15 cycle modulation crossover selector 18. Reference may be had to the copending application of R. L. Asher, Ser. No. 313,851, filed Oct. 4, 1963, now Patent No. 3,258,698, for further details on a modulation crossover selector of the type employed in this invention. The 15 cycle modulation crossovers are fed to modulation crossover selector 18 as is an output from sequencer 17. A counter 19 supplies two inputs to 15 cycle modulation crossover selector 18. Counter 19 is an elementary binary counter whose bits are arranged such that it counts backwards whenever clock pulses are applied to the input clock line thereof. Counter 19 is designed so that it is capable of being preset to numbers representing 380° and 200° when a signal is applied from either of AND circuits 20 or 21 respectively. Counter 19 yields an output 22 when it reaches the number corresponding to 300° and an output 41 when it reaches the number corresponding to 200°. Outputs 22 and 41 are furnished to the 15 cycle modulation crossover selector 18.

Modulation crossover selector 18 supplies an output pulse to the set lead of counter flip-flop 16, this output being coincident with either the positive or negative 15 cycle modulation crossovers at a pulse repetition rate of 15 c.p.s. Crossover selector 18 also supplies an output signal to one input of either AND circuits 20 or 21 depending on whether the output pulse was coincident with the positive or negative modulation crossover respectively. An output from sequencer 17 is applied to the other input of AND circuits 20 and 21. The output from counter flip-flop 16 is coupled to one of three inputs of an OR circuit 23. The output of OR circuit 23 is fed to an AND gate 24, with an output from sequencer 17, also being fed to AND circuit 24.

A clock pulse generator 25 which produces a steady stream of pulses at a frequency $f_1$, frequency $f_1$ being chosen so that the most significant bit of counter 19 will represent 320° when the clock is coupled thereto, is coupled to counter 19 through AND circuit 24. Clock pulses from clock 25 are also fed to an AND circuit 26.

The input auxiliary reference pulses 11, which occur at a 135-c.p.s. rate, are coupled to the set input of a bistable multivibrator, counter flip-flop 27, to a 135 cycle auxiliary counter 28, and to a 135 cycle modulation crossover selector 29. Modulation crossover selector 29 is similar to the above-referenced modulation crossover selector 18.

Auxiliary counter 28 consists of a simple three bit binary counter. The output of the auxiliary counter 28 is coupled to the inputs of AND circuits 30 and 31.

Modulation crossover selector 29 has inputs from the 135 cycle positive 14, and negative 15 modulation crossovers, from sequencer 17, and two inputs from a counter 32. Modulation crossover selector 29 yields a pulse train at a 135 cycle rate coincident with either the positive or negative 135 cycle modulation crossover. These pulses are furnished to the reset lead of counter flip-flop 27. Modulation crossover selector 29 also yields an output signal to AND circuits 30 or 31 depending on whether the output pulses are coincident with the positive or negative 135 cycle modulation crossovers respectively. Modulation crossover 29 also has an output which indicates completion of a selection process. This output is applied to auxiliary counter 28.

Counter 32 is a binary counter configured such that it counts forward when clock pulses are applied to the clock pulse input from an OR circuit 33. Counter 32 is adapted to be preset to numbers representing 0° and 20° when a signal is fed from AND circuits 30 or 31 respectively. Counter 32 yields an output which is coupled to the reset input of a bistable multivibrator, flip flop 34. A signal from sequencer 17 is fed to the set input of flip-flop 34, with the output of flip-flop 34 being coupled to OR circuit 23 and a counter AND circuit 35. Outputs from sequencer 17 and counter flip-flop 27 are fed to counter AND circuit 26. The output of AND circuit 26 is applied to an OR circuit 33.

A clock pulse generator 36 is coupled to AND circuit 35. The frequency of clock pulse generator 35, $f_2$, is chosen so that the most significant bit of counter 32 will represent 180° when clock pulses from clock pulse generator 36 are coupled to counter 32 through AND circuit 35 and OR circuit 33.

The parallel outputs from counters 19 and 32 are fed to a comparator 37. Only those bits up to 20° in weighting are applied to the comparator.

A parallel comparator is a device providing as many bits as it is required to compare. Each bit has two inputs. When these inputs are the same an output will result. When each bit simultaneously yields an output, indicating that the entire input words are equal an output will result from the entire parallel comparator.

The output of comparator 37 is fed to the reset lead of a bistable multivibrator, comparator flip-flop 38. A signal from sequencer 17 is coupled to the set input of this flip-flop. The output of flip-flop 38 is applied to one input to OR circuit 23.

An output from counter 19 which results when counter 19 reaches 0° is applied to an output gate 39. Output gate 39 has parallel inputs from the counter 32.

The output from output gate 39 when there is a signal on the gate lead from counter 19 is the final measured bearing. These parallel outputs are available on output leads 40.

The operation of the digital Tacan bearing system is explained below with reference to the waveforms shown in FIGURE 2. The recovered north reference pulses, waveform A in FIGURE 2, from the receiver (not shown) are applied at input lead 10. This occasions sequencer 17 to count through a cycle. In the Tacan system this cycle is eight 15 cycle reference pulses long and therefore lasts 530 ms. Sequencer 17 can therefore be in any one of eight states which is represented symbolically by E in FIGURE 2. These states will be recognized by AND circuits within the sequencer.

Operation of the digital Tacan bearing system commences when the first north reference pulse triggers sequencer 17 to state 1. When this state is entered, the 15 cycle modulation crossover selector 18 is triggered. Modulation crossover selector 18 will automatically choose the 15 cycle modulation crossover (0° or 180°) which lies away from a discontinuity. This is required since averaging will be used in making the final measurement to reduce the effects of phase jitter in the signal. However, the digital representation of bearing contains a discontinuity at 360 degrees. In the Tacan system these discontinuities also exist at each 40 degree increment. This can be troublesome when the modulation crossover is at one of these discontinuities because when the digital measurements are made, the signal may be measured on alternate sides of the discontinuity. During the averaging process this could result in a gross error (i.e., the numerical average of 0° and 360° is 180°).

The 15 cycle modulation crossover selector is supplied both the positive going and negative going 15 cycle modulation crossovers (shown in waveforms B and C of FIGURE 2) on leads 12 and 13. The output of this circuit after the selection process is completed will be only the one crossover which has been selected for further use in the bearing measurements, shown as waveform D of FIG. 2. Crossover selector 18 presets counter 19 to 380° by applying a signal to AND circuit 20 when this circuit is enabled by sequencer 17. Modulation crossover selector 18 triggers counter flip-flop 16 to the set position at the positive 15 cycle modulation crossover. Sequencer 17 has enabled counter AND circuit 24 and therefore counter 19 commences to count down. The next north reference pulse received resets counter flip-flop 16 and is also applied to the 15 cycle modulation crossover selector. Crossover selector 18 has noted whether a point 80° from the time counter 19 began to count has been reached (i.e., has a signal appeared on line 22) and also whether a point 180° from the time counter 19 began to count has been reached (i.e., has a signal appeared on line 41). If a signal is received on line 22 but not on line 41 then the positive modulation crossover is selected; if a signal appears on line 41 or no signal on lines 22 and 41 then the negative modulation crossover is selected. In the example a signal appears only on line 22 and therefore the positive modulation crossover is used for further bearing measurements. (See FIGURE 2.)

Waveform F in FIGURE 2 shows a representation of the count held in counter 19. It can be seen that initially counter 19 is preset to 380°. It then counts down until the next north burst is received. When the crossover selection process is completed, the counter is again preset to 380°. Had the negative modulation crossover been chosen, the counter would have been preset to 200°.

Sequencer 17 is cycled by the north reference pulses through states 2 to 5. During these states 4 successive measurements from the selected modulation crossover to the north reference pulse are made. A gate is formed by counter flip-flop 16 which is proportional to the complement of the 15 cycle bearing. This occurs since this circuit is set by the selected modulation crossover, and is reset by the following north reference pulse. Since sequencer 17 enables AND circuit 24, clock pulses from the clock pulse generator 15 enter the counter chain during the counting gate. The counter chain has two additional bits at the input end, but since four measurements are made, the counter will hold the correct 15 cycle bearing plus 20° at the end of these measurements. The extra 20° is present since the counter was initially set 20° high prior to the start of the bearing measurements. Waveform F in FIGURE 2 shows the contents of counter 19 during the above outlined measurements.

During sequencer state 5, the 135 cycle modulation crossover to be used is selected and the 135 cycle measurements are made in a manner similar to that explained above for 15 cycles. In this case of 135 cycles, however, counter 32 is used and this counter counts in an ascending order. Counter 32 is preceded by three bits, hence, it is necessary to make eight measurements to obtain the correct 135 cycle reading (up to a maximum of 40°). The operation can be followed by referring to waveform G of FIG. 2 which is a representation of the contents of counter 32.

When sequencer 17 first reaches state 5 it triggers the 135 cycle modulation crossover selector 29. This circuit permits counter 32 to count and based upon the arrival time of the positive modulation crossover, selects either the positive or negative 135 cycle modulation crossover for use in subsequent bearing measurements.

The 135 cycle auxiliary reference bursts incoming on lead 11 are also applied to an auxiliary counter 28. This counter permits eight 135 cycle measurements to be made by counter 32 after the initial crossover selection is completed. Sequencer 17 cannot be employed for this purpose as was the case with the 15 cycle signal because sequencer 17 is counting at a 15 c.p.s. rate and eight 135 c.p.s. measurements are made during one state thereof. The auxiliary reference pulses are also applied to the set input of counter flip-flop 27. The selected 135 cycle modulation crossovers are applied to the reset input of this flip-flop. Hence a gate is produced whose width is proportional to the measured fine bearing. The output of sequencer 17 state 5 line and this gate are applied to counter AND gate 26 which permits clock pulses from clock pulse generator 25 to enter counter 32.

Thus at the end of sequencer state 5, the 15 cycle counter 19 holds the 15 cycle bearing plus 20° and the 135 cycle counter holds the exact fine bearing up to 40°. (E.g., if the correct bearing were 276° counter 32 would hold a reading of 36°.)

During sequencer state 6, the bearing in 15 cycle counter 19 is run down until it compares with the reading in 135 cycle counter 32 in all bits up to 20° weighting (39.99 . . .° total value.)

For an actual bearing of 276° counter 19 could be reading anywhere from 276.00+ (the actual bearing 276°, plus 20° high as preset, minus up to 20° phase siting error) to 315.99+ (the actual bearing of 276° plus 20° high as preset, plus up to 20° phase siting error). When counter 19 is run down only bits up to 40° are compared, hence counter 19 will read the exact bearing after this operation.

When sequencer state 6 is reached, comparator flip-flop 38 is triggered to the set condition. This enables counter AND circuit 24 which permits clock pulses from the clock generator to cause counter 19 to count down. Since the clock pulse frequencies and the counter configurations of both counter 19 and 32 have been adjusted so that each counter chain has a weighting of 40°, comparison will be reached at each successive 40°. When the first comparison is indicated by an output from comparator 37, comparator flip-flop 38 is reset and the counting is inhibited. The 15 cycle counter 19, now holds the exact bearing reading but at a weighting of 40°.

When sequencer 17 reaches state 7, counter 32 which employs binary multiples and submultiples of 40° is preset to 0°, and flip-flop 34 is triggered to the set position. This enables counter AND circuit 24 and AND circuit 35. Thus clock pulses from clock pulse generator 25 cause counter 19 to count down, and clock pulses from clock pulse generator 36 cause counter 32 to count up. The frequency $f_2$ from clock pulse generator 36 is chosen so that counter 22 counts up with a 360° weighting. This step is required up in order to be able to have a desirable number structure. By using other frequencies for clock pulse generator 36, alternate numbering structures may be obtained. The number structure required in the early stages was to achieve 20° bits so that it repeats n (40) times, but for the final result it is desired to have a most significant bit of 180°.

When counter 19 reaches 0°, counter 32 will hold the correct bearing. This number is permitted to be read out by enabling output gates 39 by the 0° signal from counter 19.

Once an initial set of measurements have been made it is no longer necessary to utilize the entire measurement process for each updating. To enter this track mode of operation, the measured bearing set 20° high to permit 20° siting errors between modulation components is entered in the 15 cycle counter 19. This will permit the operations during states 1 through 4 of the sequencer to be bypassed.

When the 15 cycle counter reaches 0° it is immediately reset to 380° and the counts on both counters 19 and 32 continues. When counter 32 reaches capacity, flip-flop 34 is reset and further counting is thus inhibited. Counter 19 now holds the measured bearing plus 20°.

The next updating commences with the 135 cycle measurements in sequencer state 5. Ssequencer 17 repeats in this fashion as long as signals are present.

The operation of the system may be briefly summarized as follows, the different operations being controlled by the sequencer in eight separate and distinct stages.

The first north reference pulse triggers the sequencer into its first stage and each successive north reference pulse triggers it into succeeding stages until eight complete stages have been passed.

The first four stages only affect the coarse operation, while the remaining stages 5 through 8 affect both the coarse and fine.

In stage 1 the fifteen-cycle positive or negative crossover is selected and the counter 19 which is used in this process is then set to one of two levels, the 380° or the 200° level.

In stage 2 the counter 19 counts down starting with the selected crossover pulse and ending with the next following north reference pulse.

In stages 3, 4 and 5 this is repeated, the countdown starting from the count attained during the countdown of the last previous stage. The result of these four counts is to give an averaged final count representing the coarse bearing (plus an additional amount which will be discussed hereinafter). It is seen that the countdown in stages 2, 3, 4 and 5 is each approximately a quarter of the total countdown and, therefore, represents an averaging of the signal received over four 15 cycle periods or four stages.

During the fifth stage the fine bearing counter goes through a sequence of nine counts, during the first of which the 135 cycle modulation crossover is selected (either positive or negative) which sets the fine counter 32 to its initial level, and then there are eight successive cumulative counts which occur between the period of the selected 135 cycle crossover and the following auxiliary reference pulse, this total operation being also initiated by the sequencer. This cumulative count represents an averaging of the fine signal over eight successive periods between the crossover and the ensuing auxiliary reference pulse (thereby diminishing the effect of jitter).

In stage 6 of the sequencer, a comparison is made between the digits of the counter 32 representing the fine count and corresponding (the lower valued) digits of the coarse counter 19, this comparison being brought about by counting down in the counter 19 until said lower valued digits (representing the coarse bearing within a 40° sector) match those within the fine counter 32, at which point counter 19 is stopped at a level representing the true bearing.

(It will be clear why the original setting of counter 19 was higher than its proper bearing by 20°. The purpose was so that when a comparison was being made with the counter 32 that counter 19 could count down to this level and thus achieve equality therewith by counting down.)

In stage 7 of the sequencer a conversion of scales is produced. During the time that counter 19 is now made to count to zero at a certain pulse or count frequency, counter 32 counts up from zero at a second and desired count frequency. The purpose of this conversion is to translate the notation into notations suitable for representing a scale of 360°.

During stage 8 the counters are reset for further updating of the bearing measurement.

While we have described above the principles of our invention in connection with specific apparatus, it is to be clearly understood that the specification is presented by way of example and not as a limitation of the scope of our invention, as set forth in the accompanying claims.

We claim:

1. In a direction finder system, a receiver located at a first position for determining the bearing of said first position from a beacon located at a second position, said beacon emitting a complex rotating signal which is decoded at said receiver as a fundamental wave, a harmonic wave, and spaced main and auxiliary reference pulses having predetermined repetition frequencies equal to the frequencies of said fundamental and harmonic waves, respectively, said reference pulses occurring whenever said beacon orients in predetermined directions, with said fundamental wave and main reference pulse supplying coarse bearing information and said harmonic wave and auxiliary reference pulses supplying fine bearing information comprising:

a first counter;
means for setting said first counter to a predetermined value;
means for causing said first counter to count after said setting thereof for a period of time relative to coarse bearing;
a second counter;
means for setting said second counter to a predetermined value;
means for causing said second counter to count after said setting thereof for a period of time relative to fine bearing; and
means for comparing the values stored in said counters.

2. In a direction finder system a receiver as in claim 1 wherein said comparison means includes means for causing said first counter to run until the reading stored therein compares with the reading in said second counter in the lesser significant bits thereof.

3. In a direction finder system, a receiver as in claim 2 further including means for selecting a fundamental wave modulation crossover, wherein said means for causing said first counter to count for a period of time relative to bearing includes means for forming a first gate which is opened upon arrival of said selected fundamental modulation crossover and closed upon the arrival of a main reference pulse.

4. In a direction finder system, a receiver as in claim 3 further including means for selecting a harmonic wave modulation crossover, wherein said means for causing said second counter to count for a period of time relative to bearing includes means for forming a second gate which is opened upon the arrival of an auxiliary reference pulse and closed by the arrival of said selected harmonic wave modulation crossover.

5. In a direction finder system, a receiver as in claim 4 further including means for setting said second counter to zero degrees after said comparison of lesser significant bits has been made, and means for causing said first counter to count down after the setting of said second counter to zero at a first preselected rate while simultaneously causing said second counter to count up at a second preselected rate until the reading in said counter is zero.

6. In a direction finder system, a receiver as in claim 4 wherein said means for setting said first counter to a predetermined value includes means for setting said first counter to 360° if a zero degree fundamental wave crossover has been selected and means for setting said first counter to 180° if a 180° fundamental wave crossover has been selected.

7. In a direction finder system, a receiver as in claim 4 in which said means for setting said first counter to a predetermined value includes means for setting said first counter to 380° if a zero degree fundamental wave modulation crossover has been selected, and means for setting said first counter to 200° if a 180° fundamental wave modulation crossover has been selected, such that said first counter is set 20° high, thus permitting up to 20° siting error to take place without causing bearing reading error.

8. In a direction finder system, a receiver as in claim 7 in which said means for setting said second counter to a predetermined value includes means for setting said second counter to 0° if a zero degree harmonic wave modulation crossover has been selected, and means for setting said second counter to 20° if a 180° harmonic wave modulation crossover has been selected.

9. In a direction finder system, a receiver as in claim 8 wherein said first counter has two additional bits at the input thereof and further including means for causing said first counter to count down during 4 gating periods, such that an integration of readings is stored in said first counter.

10. In a direction finder system, a receiver as in claim 9 wherein said second counter has three additional bits at the input thereof and further including means for causing said second counter to count up for eight gating periods, such that an averaging of readings is stored in said second counter.

References Cited

UNITED STATES PATENTS

| | | | |
|---|---|---|---|
| 2,924,822 | 2/1960 | De Faymoreau et al. | 343—106 |
| 3,218,553 | 11/1965 | Peterson et al. | 324—68 |
| 3,218,560 | 11/1965 | Peters | 324—68 |
| 3,267,473 | 8/1966 | Galloway | 343—106 |

RODNEY D. BENNETT, *Primary Examiner.*

H. C. WAMSLEY, *Assistant Examiner.*